United States Patent
Stessen

(10) Patent No.: US 7,190,408 B2
(45) Date of Patent: Mar. 13, 2007

(54) TV-RECEIVER, IMAGE DISPLAY APPARATUS, TV-SYSTEM AND METHOD FOR DISPLAYING AN IMAGE

(75) Inventor: Jeroen Hubert Christoffel Jacobus Stessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 518 days.

(21) Appl. No.: 10/477,871

(22) PCT Filed: May 16, 2002

(86) PCT No.: PCT/IB02/01719

§ 371 (c)(1),
(2), (4) Date: Nov. 13, 2003

(87) PCT Pub. No.: WO02/096100

PCT Pub. Date: Nov. 28, 2002

(65) Prior Publication Data

US 2004/0130664 A1 Jul. 8, 2004

(30) Foreign Application Priority Data

May 17, 2001 (EP) .................................. 01201873

(51) Int. Cl.
*H04N 9/78* (2006.01)
(52) U.S. Cl. ..................................................... 348/581
(58) Field of Classification Search ................ 348/725, 348/553, 581, 569, 14.08, 14.09, 445, 556, 348/558, 913, 726
See application file for complete search history.

(56) References Cited

U.S. PATENT DOCUMENTS 4,872,054 A * 10/1989 Gray et al. .................. 348/441
5,353,119 A * 10/1994 Dorricott et al. ........... 348/446

(Continued)

FOREIGN PATENT DOCUMENTS

WO     WO9727704     7/1997

(Continued)

OTHER PUBLICATIONS

"Guide to the use of the ATSC digital television standard" (A/54, para. 10.4.1 on p. 126-127, published at http://www.atsc.org/standards/stan_rps.html).

Primary Examiner—Paulos Natnael
(74) Attorney, Agent, or Firm—Larry Liberchuk

(57) ABSTRACT

A TV-receiver 220 for receiving and decoding a broadcasted TV-signal representing an image and control data. The control data defines a vector indicating a location of a partition of important subject matter within the image. In addition an image display apparatus 200 and a TV-system comprising the TV-receiver and a method for operating the TV-receiver is described. The control data herein further defines the size of the partition showing the important subject matter and that the TV-receiver 220 further comprises a re-sampling unit being adapted to extract a re-sampled image to be displayed on the screen of a display device 200 from said decoded image by re-sampling said decoded image at a variable re-sampling rate defined at the receiving end such that the size of the partition of important subject matter in the re-sampled image is adapted according to a criterion.

11 Claims, 3 Drawing Sheets

U.S. PATENT DOCUMENTS

| | | | | |
|---|---|---|---|---|
| 5,617,147 A | * | 4/1997 | Ezaki | 348/461 |
| 5,835,129 A | * | 11/1998 | Kumar | 348/14.09 |
| 5,963,268 A | * | 10/1999 | Ko | 348/556 |
| 5,990,940 A | * | 11/1999 | Hashimoto et al. | 348/184 |
| 6,084,639 A | * | 7/2000 | Fukuoka et al. | 348/556 |
| 6,614,448 B1 | * | 9/2003 | Garlick et al. | 345/605 |

FOREIGN PATENT DOCUMENTS

| | | |
|---|---|---|
| WO | WO9819396 | 5/1998 |

* cited by examiner

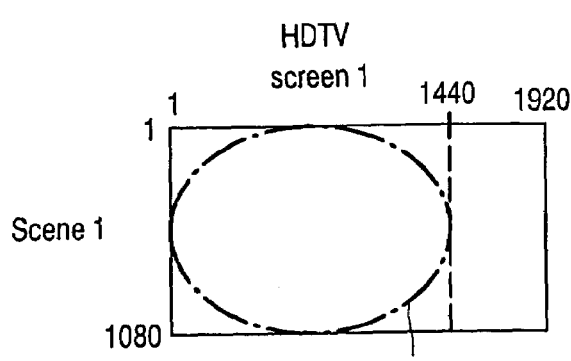
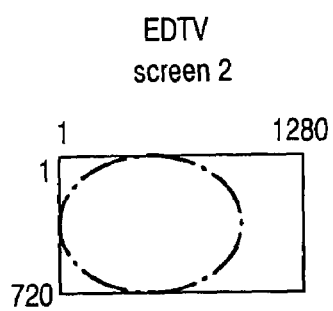
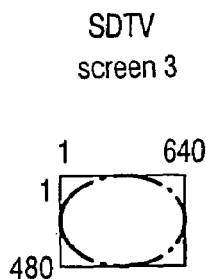
FIG. 4a     FIG. 4b     FIG. 4c
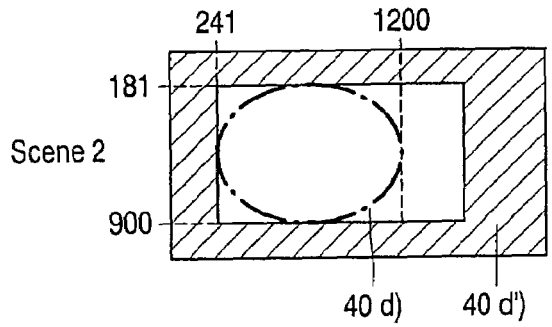
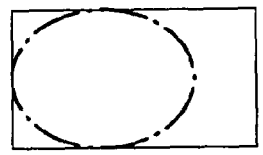
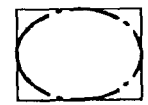
FIG. 4d     FIG. 4e     FIG. 4f
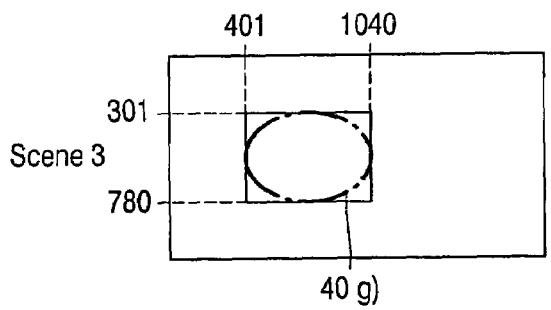
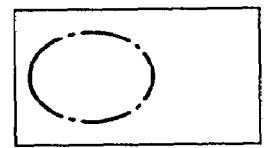
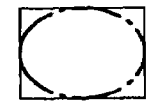
FIG. 4g     FIG. 4h     FIG. 4i
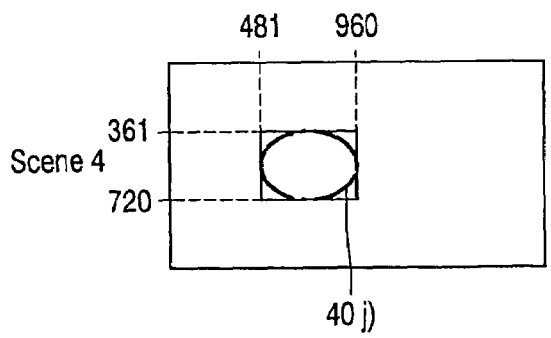
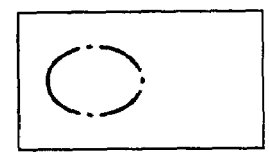
FIG. 4j     FIG. 4k     FIG. 4l

TV-RECEIVER, IMAGE DISPLAY APPARATUS, TV-SYSTEM AND METHOD FOR DISPLAYING AN IMAGE

The invention relates to a receiver comprising a decoder for receiving and decoding a signal representing an image and control data wherein the control data defines a vector indicating a location of a partition of important subject matter within said image.

The invention further relates to a TV-receiver, to an image display apparatus comprising a display device and said TV-receiver and to a TV-system comprising said image display apparatus and a broadcaster for broadcasting said TV-signal to said image display apparatus. Moreover, the invention relates to a method for operating said image display apparatus.

With the introduction of new digital television standards there will be a mix of aspect ratios (e.g. 4:3 and 16:9) and resolutions for image sizes (e.g. Standard Definition Television SDTV=720×480, High Definition Television HDTV=1280×720 or 1920×1080). Consequently, different transmissions (different types of broadcasted images) have to be made compatible with different types of image display apparatuses, i.e. the aspect ratios as well as the resolutions of the images have to adapted to the aspect ratio and the resolution of a receiving image display apparatus.

For adapting the resolutions a TV-system as shown in FIG. 5 is known in the art. It comprises a broadcaster 100 for broadcasting a TV-signal to an image display apparatus 200. The TV-signal includes image data as well as control data. The control data in particular define a fixed re-sampling rate for re-sampling the image at the receiving end in order to achieve the required resolution-adaptation. The re-sampling of the image corresponds to a reduction or an increase of the size of the entire image. According to FIG. 6 the image display apparatus 200 comprises a TV-receiver 220 and a display device 250. The TV-receiver comprises a decoder 222 for receiving and decoding said broadcasted TV-signal and a re-sampling unit 224 for re-sampling a decoded TV-signal as output by said decoder 222 at said re-sampling rate predefined by the broadcaster 100 in said control data. Such a re-sampling unit is e.g. known from WO 98/19396 and such a TV-system and in particular such a receiver is proposed in: "Guide to the use of the ATSC digital television standard" (A/54, para. 10.4.1 on page 126–127, published at http://www.atsc.org/standards/stan_rps.html).

The resulting re-sampled image as output by said re-sampling unit 224 is input to the display device 250 for being displayed on its screen and matches the required resolution or image size of said display device 250. However, disadvantageously, due to said re-sampling operation, in particular down-sampling operation, details are lost in said re-sampled image and it may be impossible for a user watching the re-sampled image on the screen to enjoy the program.

For adapting the aspect ratios "pan & scan"-operations are known in the art, e.g. from WO 97/27704. Said international patent application teaches that control data defining a vector for indicating a location of a partition of important subject matter within said image is broadcasted together with image data in form of a TV-signal to a TV-receiver. This location information is determined by the broadcaster (under operator control) so as to perform a "pan & scan" operation, i.e. so as to maintain the artistic values of the original image within the limitations of an intended display format. In case of "pan & scan" the actual screen size is larger than the partition of subject matter and thus, the entire partition can be shown on the screen without reducing its size. Possibly in at least one direction also a part of less important environment of the original image can be shown on the screen. This is illustrated in FIG. 7, showing a HDTV-image as broadcasted from a broadcaster on the left hand side and the corresponding image as displayed on an EDTV-image display apparatus after a "pan & scan"-operation on the right hand side. The ellipsoidic partition of important subject matter can be shown on the EDTV-screen without any reduction in size.

Starting from WO 97/27704 it is the object of the present invention to improve a known receiver, a TV-receiver, an image display apparatus, a TV-system and a method for displaying an image such that at least a predefined partition of important subject matter within the original broadcasted image can entirely be shown on a screen even if the size of said screen is smaller than the size of said partition with only a minimal loss of details.

This object is solved by the subject matter of claim 1. More specifically, for the known receiver this object is solved in that the control data further defines the size of said partition showing said important subject matter and that a re-sampling unit within said receiver is adapted to extract a re-sampled image to be displayed on the screen of a display device from said decoded image by re-sampling said decoded image at a variable re-sampling rate defined at the receiving end.

The claimed variable re-sampling rate at the receiving end enables—in contrast to a fixed re-sampling rate provided by a broadcaster—an individual adaptation of the size of the image and in particular of the partition to be displayed to the actual size of the screen such that advantageously details remain within the displayed image as far as possible.

According to the invention the partition of important subject matter is defined by a location vector (2 degrees of freedom) and by additional size-data, representing for example the extreme partition co-ordinates, i.e. the top-left and bottom-right pixel of a rectangular partition. Consequently, according to the invention the partition is defined by at least 4 degrees of freedom.

The receiver and the display device may be separate devices. In particular the TV-receiver may be a so-called "set-top box".

The term re-sampling includes down- and up-sampling, wherein down-sampling means a reduction and up-sampling means an increase of the size of an image or of a partition of an image.

Advantageously, the claimed receiver is—due to its re-sampling unit—capable of processing a received image such that the entire image or at least the entire partition of important subject matter can be shown on the screen of a display such that the size of the partition of important subject matter in the re-sampled image is adapted to a given criterion.

Consequently, no part of the partition needs to be discarded and the entire partition may be displayed on the screen if the criterion is defined accordingly, even if the fixed size of the screen is smaller than the size of the partition of important subject matter within the original broadcasted image.

According to a preferred embodiment the receiver comprises a discarding unit for discarding parts of the received decoded image. The operation of said discarding unit substantially corresponds to a "pan & scan" operation in order to adapt different aspect ratios of the broadcasted image and the display device. Adaptation of the aspect ratio includes the case that some parts, in particular horizontal bars may remain black when the image is displayed on the screen.

Although according to the corresponding claim the discarding unit is preferably connected between the decoder and the re-sampling unit, the discarding unit may alternatively be connected behind said re-sampling unit. The proposed combination of discarding and re-sampling operation includes the two extrema that in one specific case only a discarding operation and in another case only a re-sampling operation may be applied to the received broadcasted image. However, usually a mixture of both operations will be applied such that the image and in particular the partition of important information is only reduced as much as necessary with the result that desired details are maintained as far as possible.

Further advantageous embodiments of the receiver, in particular for defining the criterion are given in the dependent claims.

The object of the invention is further solved by a TV-receiver according to claim 6, by an image display apparatus according to claim 7, a TV-system according to claim 8 and by a method for displaying an image according to claim 9. The above identified advantages of the invention apply accordingly.

The description is accompanied by seven figures, wherein

FIG. 4 illustrates the operation of the first and second embodiment of the TV-receiver according to the invention;

In the following the invention will be described by referring to FIGS. 1 to 4.

Figure 5:
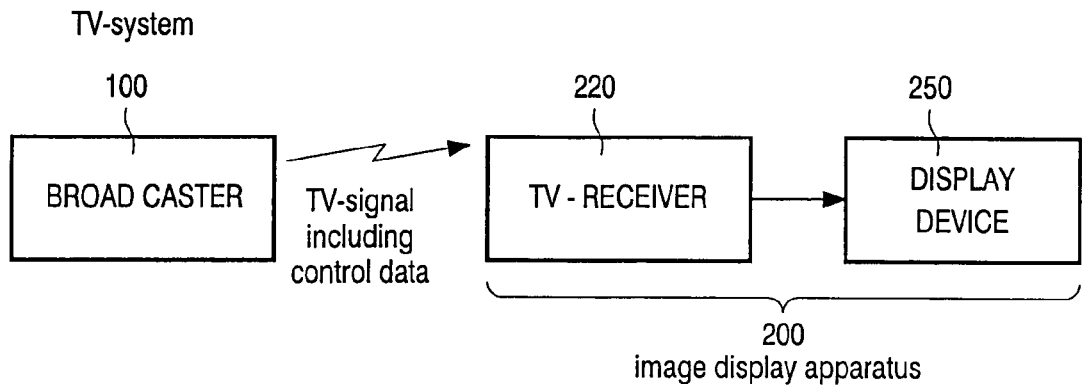
FIG. 5 shows a TV-system known in the art.

The invention substantially refers to a TV-system as explained above by referring to FIG. 5. However, in difference to the TV-system known in the art, the control data according to the invention included within a TV-signal broadcasted from a broadcaster 100 to an image display apparatus 200 does not only define a vector indicating a location of a partition of important subject matter within a broadcasted image but also define the size of said partition. The control data according to the invention does not include information about a re-sampling rate.

Figure 1:
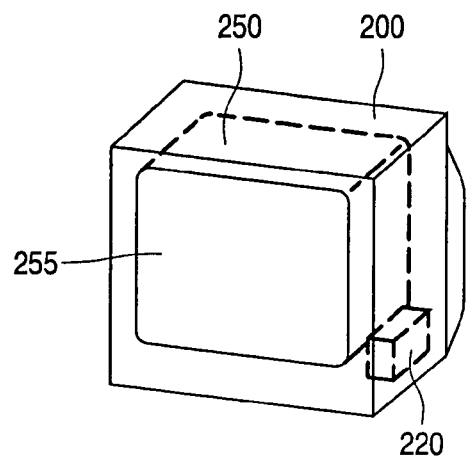
FIG. 1 shows an image display apparatus.

FIG. 1 shows an image display apparatus 200 according to the present invention comprising a TV-receiver 220 and a display device 250. The display device comprises a screen 255 for displaying images to a user watching the screen.

Figure 2:
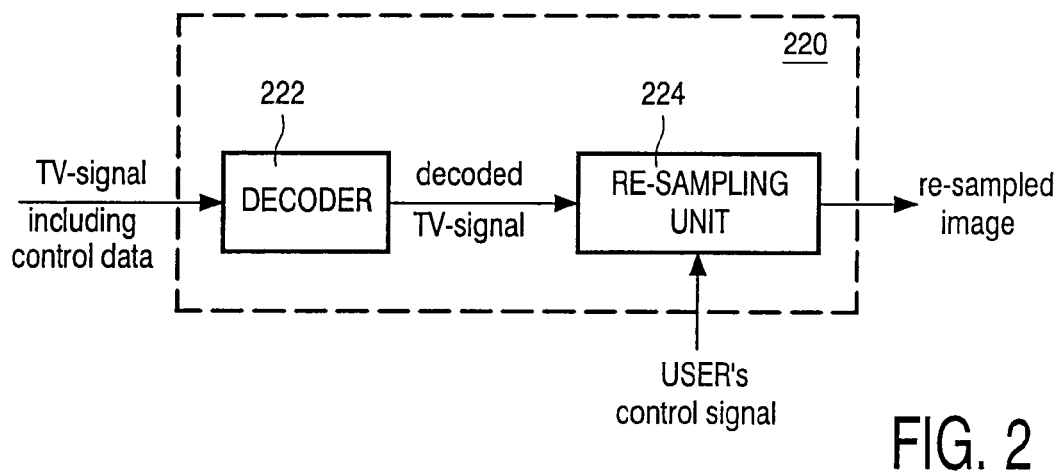
FIG. 2 shows a first preferred embodiment of the TV-receiver according to the invention.
Figure 6:
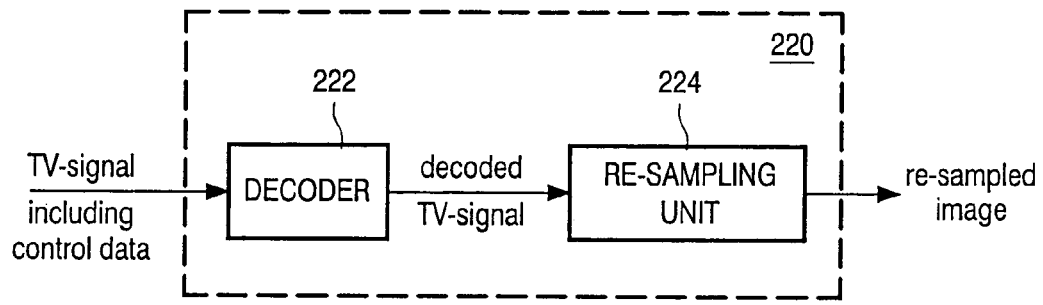
FIG. 6 shows a TV-receiver; known in the art.
Figure 7:
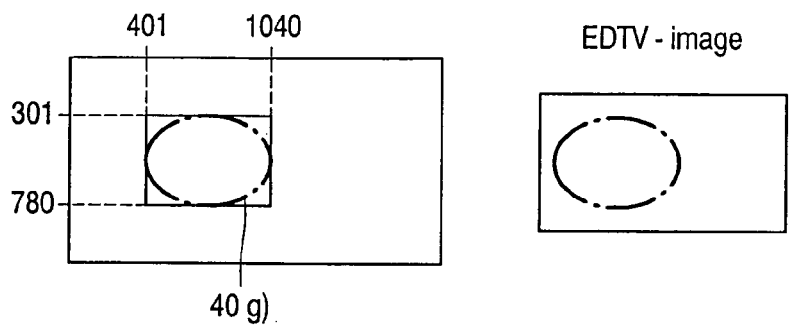
FIG. 7 illustrates the "pan & scan"-operation as known in the art.

FIG. 2 shows a first preferred embodiment of the TV-receiver according to the present invention. The hardware of said receiver 220 substantially corresponds to the hardware of the TV-receiver known in the prior art and described above by referring to FIG. 6. However, in contrast to the known TV-receiver the TV-receiver 220 and in particular the re-sampling unit 224 according to the present invention evaluates the control data according to the invention as defined above. More specifically, the re-sampling unit 224 is adapted to extract a re-sampled image to be displayed on the screen 255 of the display device 250 from a decoded image as output by the decoder 222. The extraction is done by re-sampling said decoded image at a variable re-sampling rate defined at the receiving end, preferably within said re-sampling unit 224 such that the size of the partition of important subject matter in the re-sampled image is adapted according to a criterion. For example, according to said criterion, the variable re-sampling rate is defined such that, if the fixed size of the screen 255 is great enough, the whole partition of important subject matter is displayed on the fixed screen 255 of the display device 250 in its original size as given in the received and decoded image.

Alternatively, according to said criterion, the variable sampling rate is defined such that, if the fixed size of the screen 255 is smaller than the original size of the partition of important subject matter, the size of the partition is reduced not more than necessary for being totally displayed on the screen by re-sampling the decoded image at an appropriate re-sampling rate.

By variably defining the re-sampling rate at the receiving end the re-sampling rate can be adapted to the actual size of the predefined partition such that the size of said partition is only reduced as much as necessary for being displayed on the fixed sized screen. Consequently, a maximum of details of said partition can be displayed on the screen. In that way the invention differs from the prior art where the size of an entire image was reduced in response to the re-sampling rate predefined at the transmitting end.

According to the invention the re-sampling rate is not only variably defined with respect to the actual size of the partition and the fixed size of the screen 255 but may also be manipulated by a user watching the re-sampled image on the screen. The re-sampling unit 224 usually only carries out an adaptation of the size of the partition of important subject matter by down-sampling for example a received HDTV-image to the required size of the screen of an EDTV- or SDTV-display device. However, such a down-sampled image may not be appropriate to the user and thus, the re-sampling unit 224 is adapted to receive a control signal from the user for manipulating the variable re-sampling rate such that the re-sampled image displayed on the screen is adapted to the user's individual viewing angle when watching the screen 255 and/or to the user's individual visual acuity.

Figure 3:
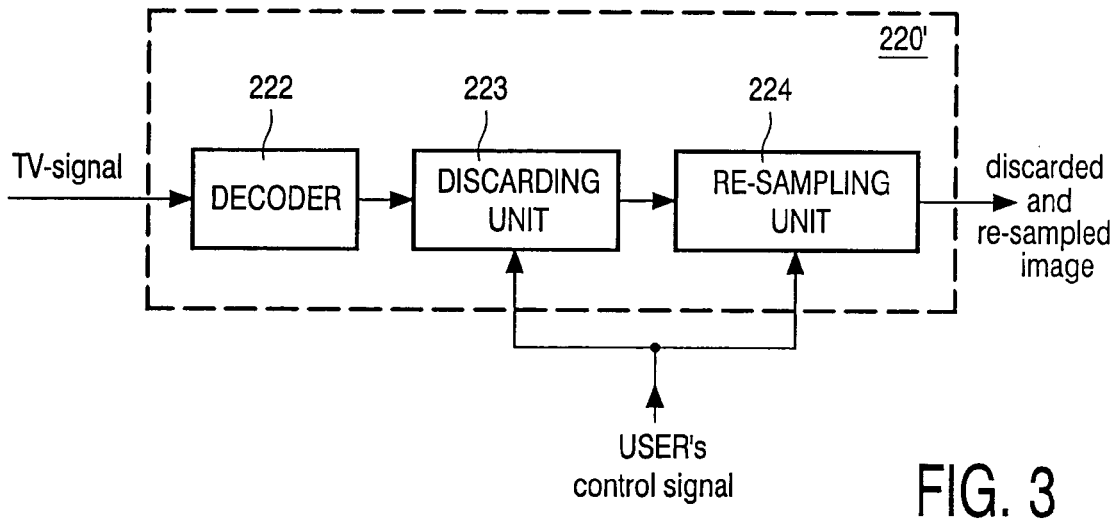
FIG. 3 shows a second preferred embodiment of the TV-receiver according to the present invention.

FIG. 3 shows a second preferred embodiment of the TV-receiver 220' according to the present invention. It differs from the first embodiment of the TV-receiver 220 shown in FIG. 2 only in a discarding unit 223 being connected between said decoder 222 and said re-sampling unit 224. Said discarding unit 223 discards parts of the received decoded image in response to said received decoded control data such that the partition of important subject within received image is located in a remaining image at a similar position as in the received image. The operation of the discarding unit 223 substantially corresponds to a "pan & scan"-operation. Said remaining image is output by said discarding unit 223 and input to the re-sampling unit in that its format is adapted to the fixed format of the screen 225 by a re-sampling operation.

The user may provide a control signal to the discarding unit 223 as well as to the re-sampling unit 224 for manipulating the control data and thus, for manipulating the processing of the image, in order to achieve an appropriate image displayed on the screen.

The operation of the two embodiments of the TV-receiver 220 and 220' according to the invention will now be explained in more detail by referring to FIG. 4.

There in each line three television display screens are shown, for example in the left column a HDTV-screen, 1920×1080, (16:9); in the middle column an EDTV-screen: 1280×720 (16:9) and in the right column a SDTV-screen: 640×480 (4:3). It is assumed that images are always produced in the HDTV-format; in that format the useable pixel co-ordinates vary from (1,1) to (1920, 1080). The produced HDTV-images are transmitted to smaller sized EDTV- or SDTV screens.

In FIG. 4 the three screen sizes are listed from left to right and four scenes are listed from top to bottom. All twelve situations are drawn on the same scale. The partition of important subject is drawn as an ellipse. For facilitation of indication said partitions are hereinafter referred to by the co-ordinates of framing rectangles; said co-ordinates are part of the control data provided by the broadcaster. The less important environment is then the image area around this ellipse or around said framing rectangles.

In each line the location and/or the sizes of the partition of the important subject matter within the larger image or scene vary. It shall be assumed that there is an operator or an automatic machine who or which determines for each scene the optimum partition of important subject matter within the entire image at the broadcaster's end. In practice the size of said partition will be not greater than the fixed size of the screen of the display on which the image and the partition shall be displayed; more specifically, if the partition is produced in the HDTV-format and shall be displayed on a SDTV-screen the size of the partition is preferably chosen not greater than the actual size of said SDTV-screen.

The operator can be imagined as a virtual SDTV-camera that operates within the image that is captured by a HTDV-camera. He tries to select only the most important subject matter.

The size and the location of the partition of important subject matter can be indicated by the co-ordinates of the top-left and bottom-right corners of the framing rectangle. These co-ordinates are transmitted as control data to the TV-receiver. For example, the location or center of the partition is approximately at co-ordinates (720, 450)=(3/8, 4/8) and the size of the partition may vary according to the following examples:

Scene 1 (very large subject): subject size is 1440×1080, rectangle is (1,1)-(1440, 1080).
Scene 2 (medium large subject): subject size is 960×720, rectangle is (241, 181)-(1200, 900).
Scene 3 (medium small subject): subject size is 640×480, rectangle is (401, 301)-(1040, 780).
Scene 4 (very small subject): subject size is 480×360, rectangle is (481, 361)-(960, 720).

If the actual screen size is larger than the rectangle of the important subject, then the entire subject can be shown without reducing its size, and possibly in at least one direction also a part of its less important environment can be shown. This is a case of "pan & scan".

If the actual screen size is smaller than the rectangle of the important subject, then the entire important subject can be shown only by reducing its size, and at least in one direction none of its environment can be shown. This is a case of "re-sampling" (specifically: down-sampling/less resolution).

Both cases are illustrated graphically in FIG. 4 and numerically in the following 4 tables for the 4 scenes:

|  | Total size | Subject size | Rectangle around subject = partition | Ratio |
|---|---|---|---|---|
| FIG. 4, line 1 |  |  |  |  |
| Scene 1 | 1920 × 1080 | 1440 × 1080 | (1, 1)–(1440, 1080) | N/A |
| Screen 1 | 1920 × 1080 | 1440 × 1080 | (1, 1)–(1440, 1080) | 1/1.00 |
| Screen 2 | 1280 × 720 | 960 × 720 | (1, 1)–(960, 720) | 1/1.50 |
| Screen 3 | 640 × 480 | 640 × 480 | (1, 1)–(640, 480) | 1/2.25 |
| FIG. 4, line 2 |  |  |  |  |
| Scene 2 | 1920 × 1080 | 960 × 720 | (241, 181)–(1200, 900) | N/A |
| Screen 1 | 1920 × 1080 | 960 × 720 | (241, 181)–(1200, 900) | 1/1.00 |
| Screen 2 | 1280 × 720 | 960 × 720 | (1, 1)–(960, 720) | 1/1.00 |
| Screen 3 | 640 × 480 | 640 × 480 | (1, 1)–(640, 480) | 1/1.50 |
| FIG. 4, line 3 |  |  |  |  |
| Scene 3 | 1920 × 1080 | 640 × 480 | (401, 301)–(1040, 780) | N/A |
| Screen 1 | 1920 × 1080 | 640 × 480 | (401, 301)–(1040, 780) | 1/1.00 |
| Screen 2 | 1280 × 720 | 640 × 480 | (81, 121)–(720, 600) | 1/1.00 |
| Screen 3 | 640 × 480 | 640 × 480 | (1, 1)–(640, 480) | 1/1.00 |
| FIG. 4, line 4 |  |  |  |  |
| Scene 4 | 1920 × 1080 | 480 × 360 | (481, 361)–(960, 720) | N/A |
| Screen 1 | 1920 × 1080 | 480 × 360 | (481, 361)–(960, 720) | 1/1.00 |
| Screen 2 | 1280 × 720 | 480 × 360 | (161, 181)–(640, 540) | 1/1.00 |
| Screen 3 | 640 × 480 | 480 × 360 | (81, 61)–(560, 420) | 1/1.00 |

The partition of important subject has been expressed in the co-ordinates of the display, according to the (smaller) screen size. Often there is some room left for showing the environment.

The (variable) down-sampling ratio according to the invention is determined by the (fixed) actual screen size and the (variable) size of the important subject. This leads to a more favourable (closer to 1/1.00) re-sampling ratio than in the standard case of ATSC where the (fixed) re-sampling ratio is determined by the (fixed) actual screen size and the (fixed) size of the entire transmitted image. The favourable re-sampling rate has the advantage that more details can remain in the displayed image.

FIG. 4 shows that not always the entire background is shown, because the variable re-sampling ratio of the image is often larger (closer to 1/1.00) than the ratio of screen size to image size. Only in FIGS. 4b, 4c and 4f the image size must be reduced. The four trivial cases shown in FIGS. 4a, d, g and j are not counted because there the HDTV display size is equal to the HDTV image size. For the two other display sizes EDTV and SDTV that are smaller than HDTV, this will often lead to preservation of details in the important subject.

The present invention has been explained in the above Figures by means of embodiments as a TV-receiver that receives a broadcasted TV-signal. However, the invention can also be applied in other systems where an image is sent from a source to a destination apparatus that processes the image for display. Also in these cases, the signal can contain control data, in addition to the image data, whereby the control data define the size of the partition with important subject matter. An example of such other system is a server sending images in the form of streaming video over the Internet to remote stations also connected to the Internet.

The invention claimed is:

1. A receiver comprising:
a decoder for receiving and decoding a signal representing an image and control data wherein the control data defines a vector indicating a location of a partition of important subject matter within said image:
the control data further defining the size of said partition showing said important subject matter; and
a re-sampling unit for extracting a re-sampled image to be displayed on the screen of a display device from said decoded image by re-sampling said decoded image at a variable re-sampling rate defined at the receiving end such that the size of the partition of important subject matter in the re-sampled image is adapted according to a criterion.

2. The receiver as claimed in claim 1, wherein according to said criterion the variable sampling rate is defined such that, if the fixed size of the screen is great enough, the whole partition of important subject matter is displayed on the fixed-sized screen of the display device in its original size as given in the received and decoded image.

3. The receiver as claimed in claim 1, wherein according to said criterion the variable sampling rate is delined such that, if the fixed size of the screen is smaller than the original size of the partition of important subject matter, the size of the partition is reduced not more than necessary for being totally displayed on the screen by re-sampling the decoded image at an appropriate re-sampling rate.

4. The receiver as claimed in claim 1, wherein the criterion is manipulated by the user watching the resampled image on the screen such that the variable resampling rate is adapted to the user's individual viewing angle when watching the screen and/or the user's individual visual acuity.

5. The receiver as claimed in claim 1, wherein the receiver further comprises a discarding unit being connected between said decoder and said re-sampling unit for discarding parts of the received decoded image in response to said control data such that the partition of important subject matter is located in a remaining image at a similar position as in the received image.

6. TV-receiver comprising the receiver as claimed in claim 1, suitable for receiving and processing a broadcasted TV-signal.

7. Image display apparatus comprising a display device and the TV-receiver according to claim 6.

8. TV-System comprising:
a broadcaster for broadcasting a TV-signal, representing an image and control data, to at least one image display apparatus wherein the control data defines a vector indicating a location of a partition of important subject matter within said image; and
said image display apparatus comprising:
a TV-receiver including a decoder for receiving and decoding said TV-signal, and
a display device being connected to said TV-receiver and having a screen;
wherein
the control data further defines the size of said partition; and
the TV-receiver further includes a re-sampling unit for extracting a re-sampled image to be displayed on the screen from said decoded image by re-sampling said decoded image at a variable re-sampling rate defined at the receiving end such that the size of the partition of important subject matter in the re-sampled image is adapted to the fixed size of the screen of the display device according to an individual criterion.

9. Method for displaying an image, comprising:
receiving and decoding a signal representing an image and control data defining a vector indicating a location of a partition of important subject matter within said image;
wherein
the control data further defines the size of said partition important subject matter; and
a re-sampled image to be displayed on the screen of a display device is extracted from said decoded image by re-sampling said decoded image at a variable re-sampling rate defined at the receiving end such that the size of the partition of important subject matter in the re-sampled image is adapted to the fixed size of the screen of the display device according to an individual criterion.

10. The method of claim 9, further comprising
manipulating, by the user watching the resampled image on the screen, the criterion such that the variable resampling rate is adapted to the user's individual need.

11. The method of claim 9, further comprising
discarding parts of the received decoded image in response to said control data such that the partition of important subject matter is located in a remaining image at a similar position as in the received image.

* * * * *